United States Patent
Kozhemiak et al.

(10) Patent No.: US 10,523,606 B2
(45) Date of Patent: Dec. 31, 2019

(54) GENERATING INTERACTIVE MESSAGES WITH ASYNCHRONOUS MEDIA CONTENT

(71) Applicant: Snap Inc., Santa Monica, CA (US)

(72) Inventors: Grygoriy Kozhemiak, Odesa (UA); Victor Shaburov, Pacific Palisades, CA (US); Trevor Stephenson, Camarillo, CA (US)

(73) Assignee: Snap Inc., Santa Monica, CA (US)

( * ) Notice: Subject to any disclaimer, the term of this patent is extended or adjusted under 35 U.S.C. 154(b) by 136 days.

(21) Appl. No.: 15/860,397

(22) Filed: Jan. 2, 2018

(65) Prior Publication Data

US 2019/0207884 A1 Jul. 4, 2019

(51) Int. Cl.
G06F 15/16 (2006.01)
H04L 12/58 (2006.01)
H04L 29/08 (2006.01)

(52) U.S. Cl.
CPC ............ H04L 51/10 (2013.01); H04L 67/146 (2013.01)

(58) Field of Classification Search
CPC ............................... H04L 51/10; H04L 67/146
See application file for complete search history.

(56) References Cited

U.S. PATENT DOCUMENTS

| 8,595,757 B2 * | 11/2013 | White | H04N 7/17318 |
| | | | 725/1 |
| 8,887,189 B2 * | 11/2014 | Beyabani | H04H 60/80 |
| | | | 725/17 |
| 9,185,348 B2 * | 11/2015 | Choi | H04N 21/252 |

(Continued)

FOREIGN PATENT DOCUMENTS

| EP | 2779633 | 9/2014 |
| WO | 2015189606 | 12/2015 |
| WO | 2019136089 | 7/2019 |

OTHER PUBLICATIONS

"FaceSwapper—Create Perfect-Looking Collages and Win Photoshopping Contests!", Luxand Face Recognition, [Online] Retrieved from the internet on Apr. 4, 2019: URL:https: web.archive.org web 20170606072837 http: luxand.com faceswapper , (Jun. 6, 2017), 3 pgs.

(Continued)

*Primary Examiner* — Moustafa M Meky
(74) *Attorney, Agent, or Firm* — Schwegman Lundberg & Woessner, P.A.

(57) ABSTRACT

Systems and methods are provided for sending serialized data for an interactive message comprising a first session data item to a second computing device to render the interactive message using the first session data item and display the rendered interactive message comprising a first media content item associated with a first interactive object and receiving, from the second computing device, a second media content item associated with a second interactive object of the interactive message. The systems and methods further provided for generating a second session data item for the second interactive object of the interactive message, adding the second session data item to the serialized data, and sending the serialized data to a third computing device to render the interactive message using the serialized data and display the rendered interactive message comprising the first media content item and the second media content item.

20 Claims, 14 Drawing Sheets

(56) References Cited

U.S. PATENT DOCUMENTS

| | | |
|---|---|---|
| 9,314,692 B2 | 4/2016 | Konoplev et al. |
| 2009/0228938 A1* | 9/2009 | White ................ H04N 7/17318 |
| | | 725/87 |
| 2009/0237328 A1 | 9/2009 | Gyorfi et al. |
| 2016/0269350 A1* | 9/2016 | Rosen ..................... H04L 51/36 |
| 2017/0134456 A1* | 5/2017 | McDonnell ......... H04L 65/4076 |
| 2017/0220312 A1* | 8/2017 | Lee ......................... H04W 4/12 |
| 2019/0207885 A1 | 7/2019 | Kozhemiak et al. |

OTHER PUBLICATIONS

"Luxand—FaceMorpher—Create Funny Face Animations. Morph them All!", Luxand Face Recognition, [Online] Retrieved from the internet on Apr. 4, 2019: URL:https: web.archive.org web 20170608072330 http: www.luxand.com facemorpher , (Jun. 8, 2017), 3 pgs.

"About Luxand BabyMaker—What Will Your Baby Look Like? Download Luxand BabyMaker on the AppStore! You Just Need Two Photos!", Luxand Face Recognition, [Online] Retrieved from the internet on Apr. 4, 2019: URL:https: web.archive.org web 20171017050945 https: www.luxand.com babymaker , (Oct. 17, 2017), 5 pgs.

"International Application Serial No. PCT US2019 012081, Written Opinion dated Apr. 15, 2019", 8 pgs.

"International Application Serial No. PCT US2019 012081, International Search Report dated Apr. 15, 2019", 5 pgs.

\* cited by examiner

GENERATING INTERACTIVE MESSAGES WITH ASYNCHRONOUS MEDIA CONTENT

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. Conventionally, a first user sends a message to a second user or to several users, and the second users or several users can view the message. The second user or several users may then create a new message and send the new message to the first user or other users.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
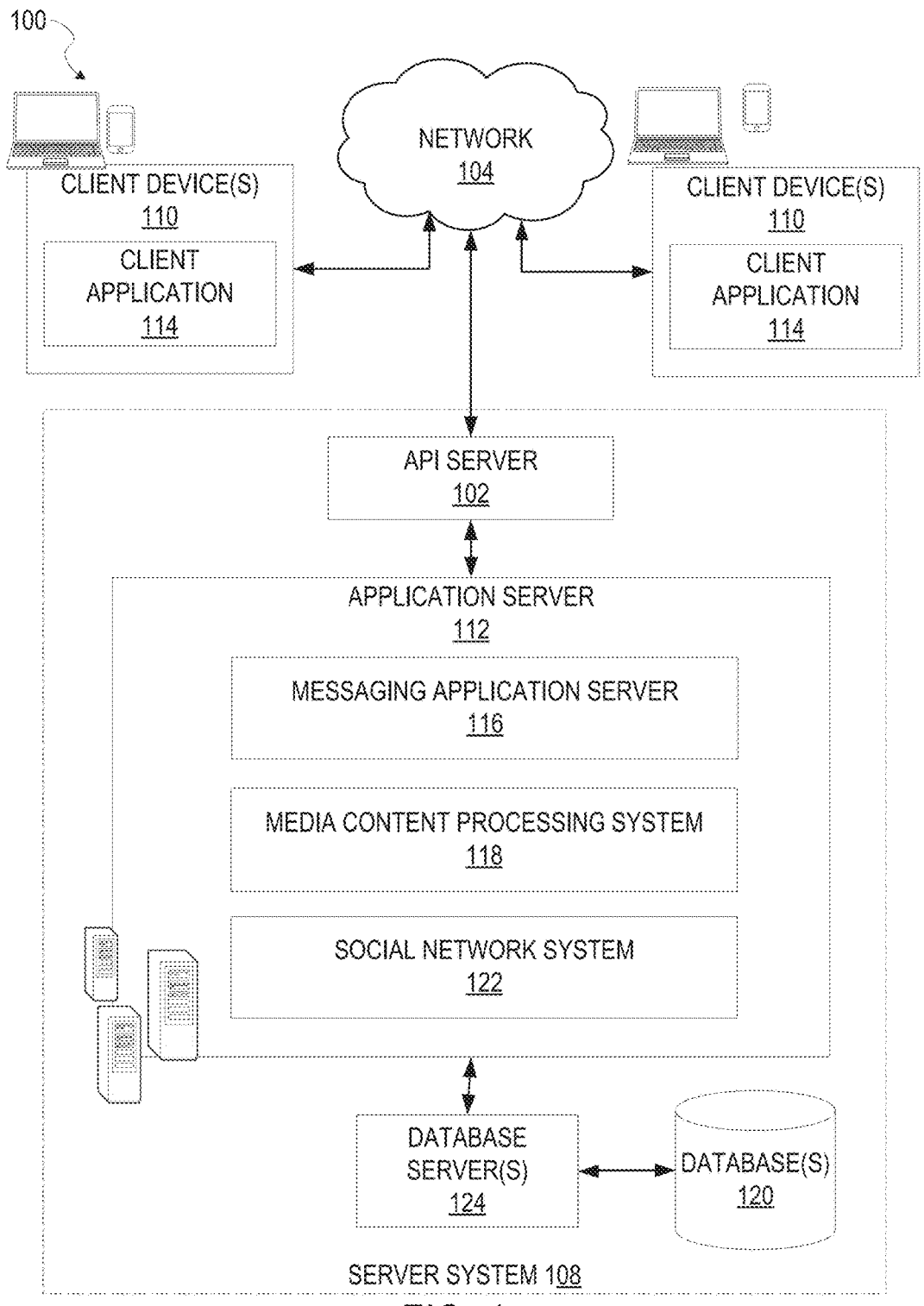
FIG. 1 is a block diagram showing an example messaging system for exchanging data (e.g., messages and associated content) over a network, according to some example embodiments.

Systems and methods described herein relate to generating interactive messages with asynchronous media content. As explained above, typically in a messaging system, a first user creates and sends a message to a second user. The second user receives the message from the first user and then creates and sends a new message back to the first user, or to other users. Example embodiments allow for interactive messaging that allow users to interact with each other via an interactive message. For example, a first user may create a message using personal media content, such as capturing a video of himself. The first user may send the message to a second user. The second user may view the message that has the first user's personal media content and then add her own personal media content, such as a video of herself. The second user may send the message with the first user's personal media content and the second user's personal media content to a third user, back to the second user, or to several users. The third user may view the message that has the first user's personal media content and the second user's personal media content and then add her own personal media content, such as a video of herself. The third user may then send the message to one or more other users. In this way, the message is passed from one user to the next and each user is able to contribute to the message. These asynchronous experiences can be captured in an interactive message.

An interactive message may be a predefined message (e.g., videos, images, etc.) with a plurality of objects associated with different areas or characters in the interactive message for which users may add personal content (e.g., band members, game players, locations in a scene, etc.). For example, an interactive message may be a video of a band playing that has an object for each band member. Users may be able to add an image or video of their face to the face for each band member.

One way to send an interactive message with personal media content from one or more users is to recompress the interactive message each time personal media content is added and then send the interactive message as one file to another user. For example, when the second user adds her personal content to the interactive message, the computing device would generate the interactive message by using the interactive message received from the first user and overlaying the personal content from the second user and then recording the entire message as one file. This method, however, may result in a very large file size which may not be suitable for sending and receiving by computing devices, such as mobile devices. Moreover, the inventors found that recompressing a video several times results in compression artifacts. For these reasons, example embodiments utilize the original personal content from each user to recreate the interactive message each time it is generated by a computing device receiving the interactive message. Moreover, example embodiments allow for a portion or subset of an image or video to be recorded (e.g., just a face of a user) for an object in an interactive message, to reduce file size for the images and video. Accordingly, example embodiments provide for a more efficient system by using smaller file sizes, and for higher quality messaging by using original personal content.

Figure 6:
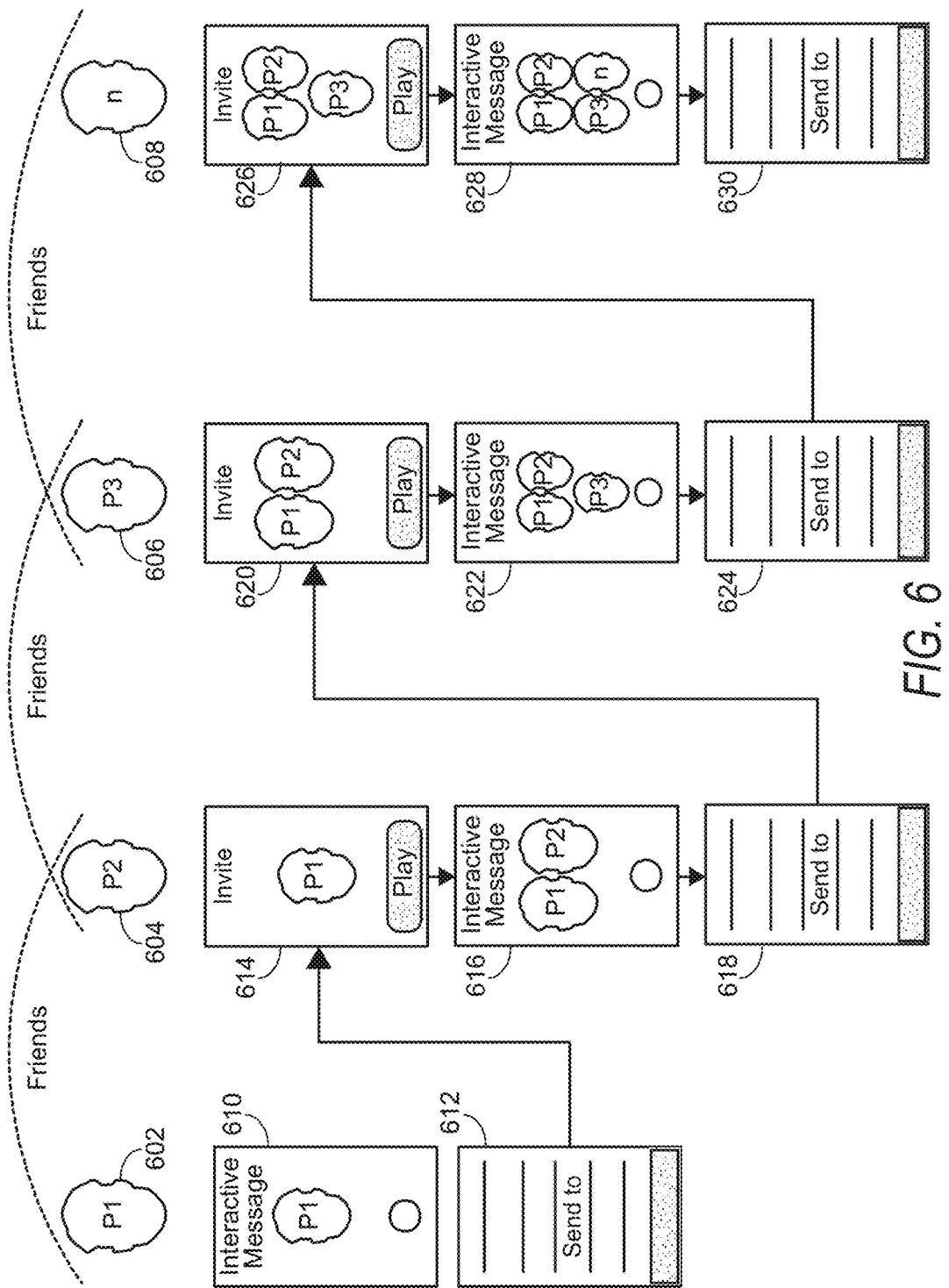
FIG. 6 is a diagram illustrating an example of sharing interactive messages, according to some example embodiments.

Before describing further detail, FIG. 6 is described to illustrate an example of sharing interactive messages, according to some example embodiments. For example, there may be a number of users, such as P1 (602), P2 (604), P3 (606), through n (608) users. A first user device 610 for user P1 generates an interactive message using input from user P1 (e.g., text, audio, video, image, etc.). User P1 may indicate 612 that he wishes to send the interactive message to at least user P2. The first user device 610 sends the interactive message to a second user device 614 associated with user P2. The second user device 614 renders and displays the interactive message. The second user device 614 generates content, using input from user P2 (e.g., text, audio, video, image, etc.), to add to the interactive message 616. User P2 may indicate 618 that she wishes to send the interactive message 616 to a third user device 620 associated with user P3. The third user device 620 renders and displays the interactive message 622. The third user device 620 generates content, using input from user P3 (e.g., text, audio, video, image, etc.), to add to the interactive message 622. User P3 may indicate 624 that she wishes to send the interactive message 622 to a fourth user device 626 associated with user n. The fourth user device 626 renders and displays the interactive message 628. The fourth user device 626 generates content, using input from user n (e.g., text, audio, video, image, etc.), to add to the interactive message 628. User n may indicate 630 that she wishes to send the interactive message 628 to a fifth user device, and so this process may continue. Note that this diagram illustrates sending interactive messages in a chain (e.g., from one user to the next user). In other example embodiments, a user may send an interactive message to more than one user and then each of those users may send the message to one or more users.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via a network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third party server(s), may interact with the server system 108 via API server 102 via a programmatic interface provided by the API server 102. For example, one or more of the third party applications may request and utilize information from the server system 108 via the API server 102 to support one or more features or functions on a website hosted by the third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 100 are invoked and controlled through functions available via user interfaces (UIs) of the client application 114.

In the server system 108, the API server 110 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of a list of friends of a user of a client device 110; the retrieval of such collections; the retrieval of messages and content; the adding of friends to and deletion of friends from a social graph; the location of friends within a social graph; openimg an application event (e.g., relating to the client application 114); and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
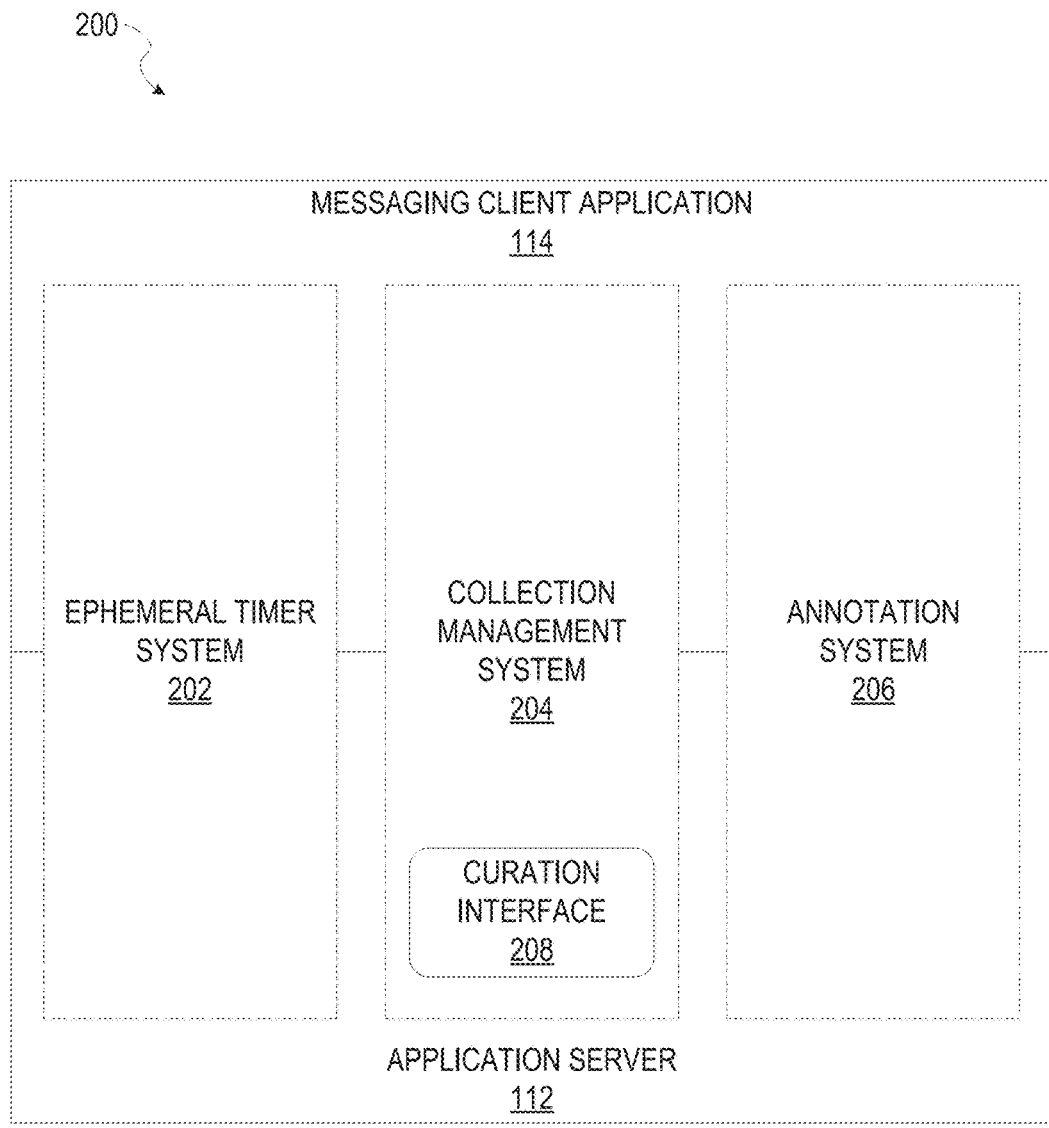
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible form managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
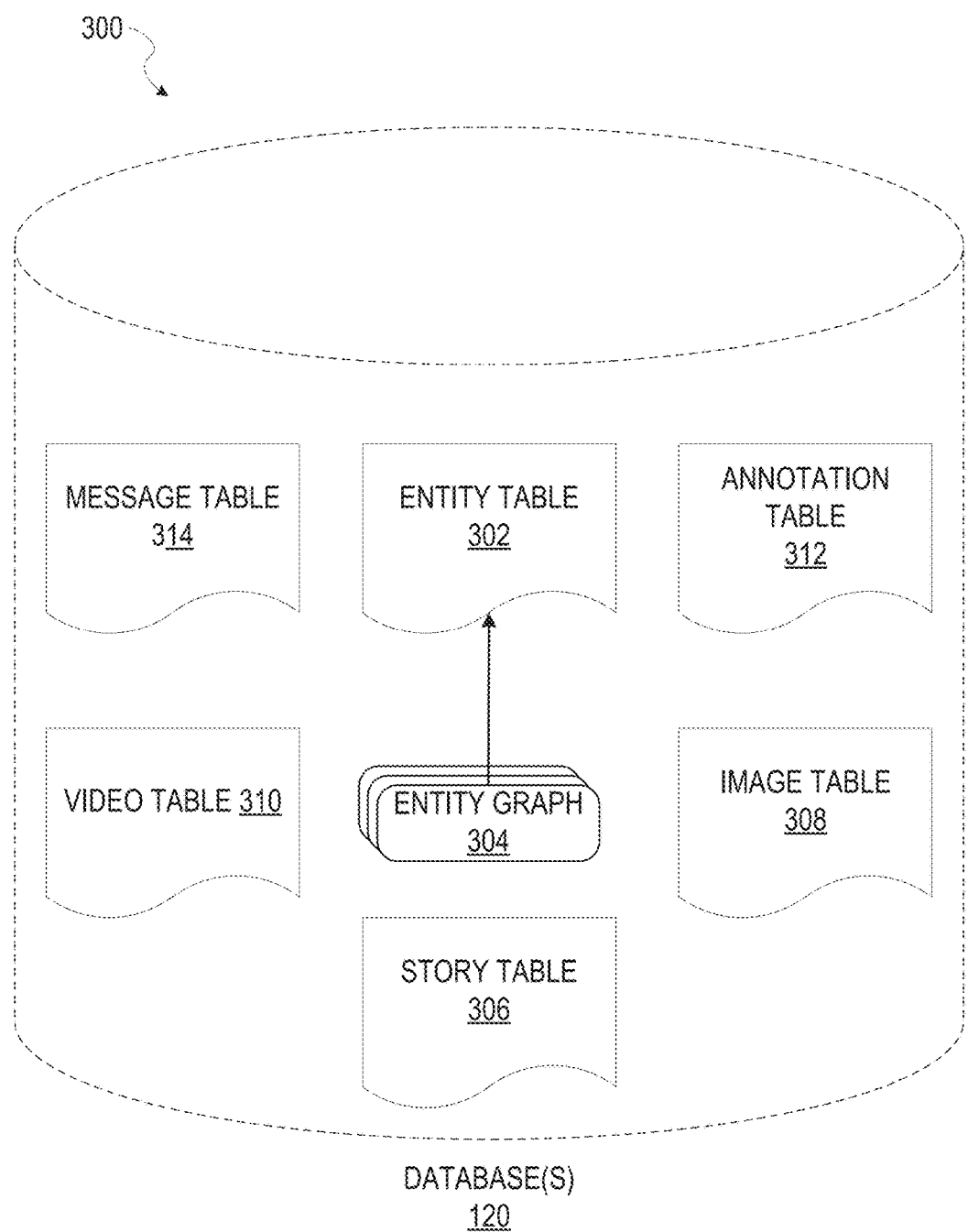
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
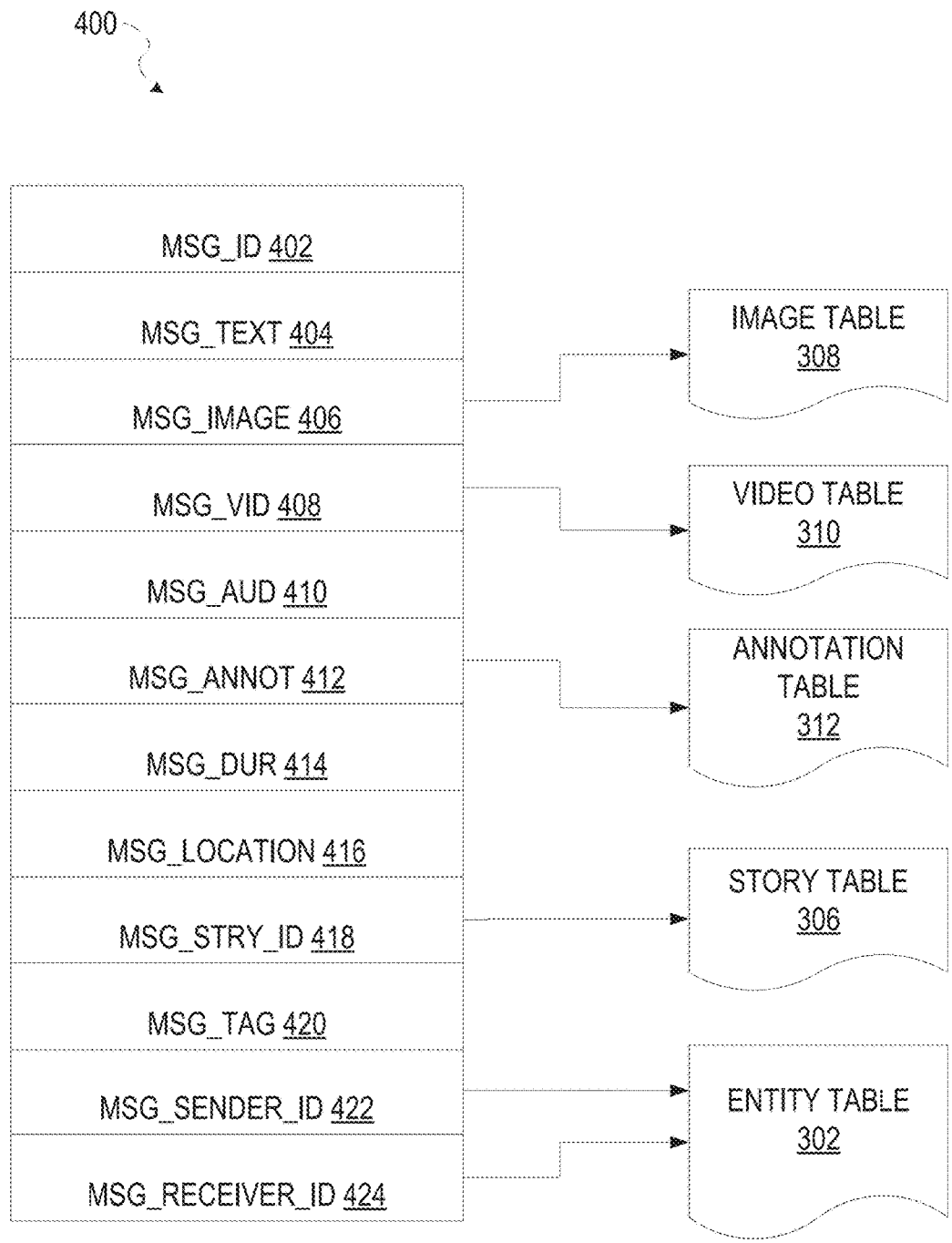
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

A message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
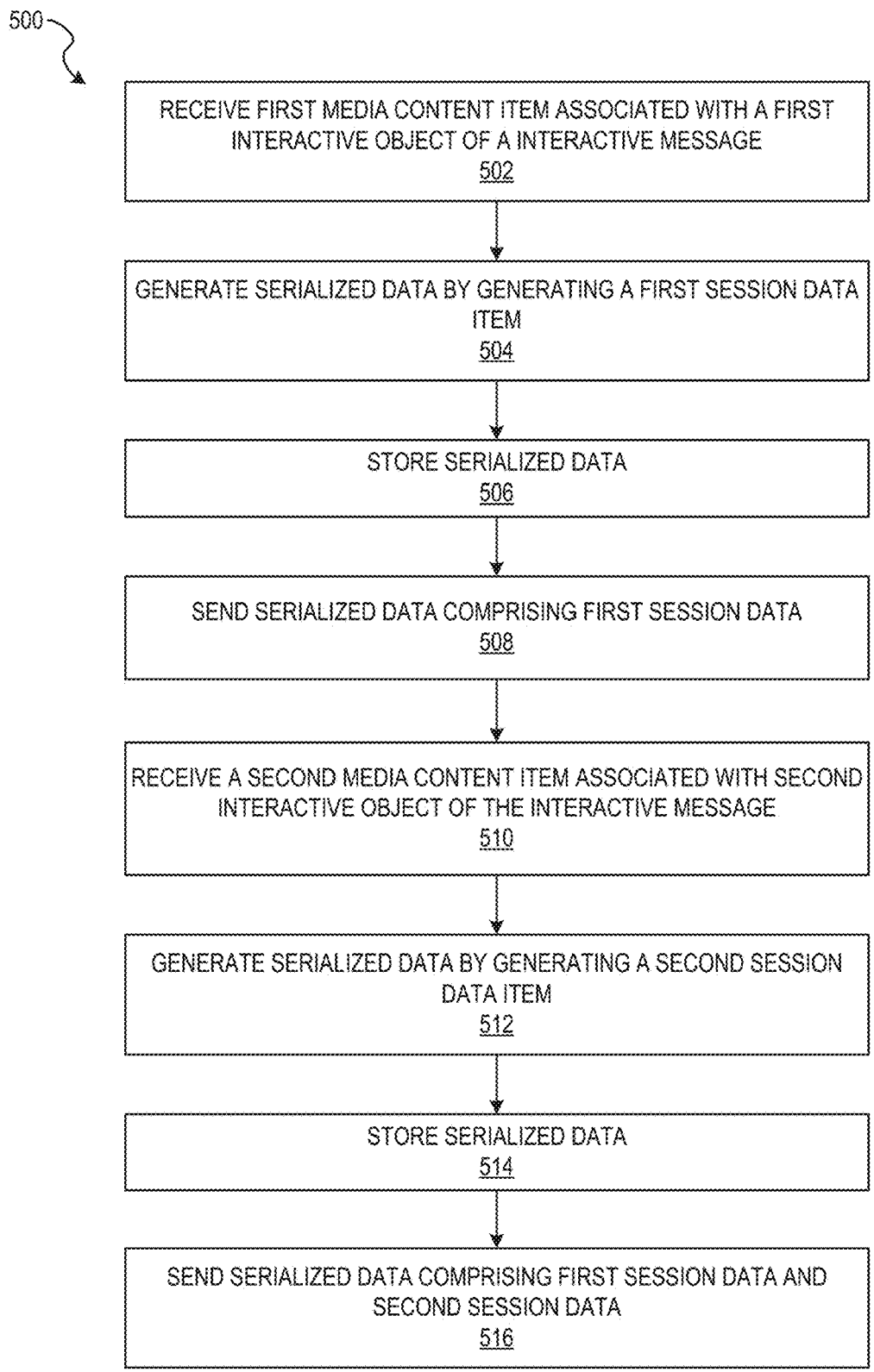
FIG. 5 is a flow chart illustrating aspects of a method, according to some example embodiments.

FIG. 5 is a flow chart illustrating aspects of a method 500, according to some example embodiments. For illustrative purposes, the method 500 is described with respect to the networked system 100 of FIG. 1. It is to be understood that the method 500 may be practiced with other system configurations in other embodiments.

In operation 502, a server computer (e.g., via server system 108) receives a first media content item associated with a first interactive object of an interactive message. The interactive message may comprise a plurality of interactive objects. The server computer may receive the first media content item from a first computing device (e.g., client device 110). The server computer may receive the first media content item associated with the first interactive object of the interactive message in a request to send the interactive message to one or more other computing devices.

In one example, the first computing device may send a request for the interactive message to the server computer. For example, a first user may be using the first computing device to generate a message to send to one or more users (e.g., via a messaging application running on the first computing device). The user may indicate that he wishes to generate an interactive message (e.g., via selecting a menu item, interacting with a touch screen of a display of the first computing device, interacting with a button on the first computing device, and the like). The interactive message may be available locally on the first computing device (e.g., stored in memory of the first computing device) or may be requested from the server computer. If the interactive message is requested from the server computer, the server computer receives the request for the interactive message and sends the interactive message to the first client device.

The first computing device may display the interactive message on a display of the first computing device. The first user may capture a media content item (e.g., an image or video), input text or audio, or otherwise interact with the interactive message to add media content to the interactive message. For example, the user may use a camera device of the first computing device to capture a video or image.

Figure 7:
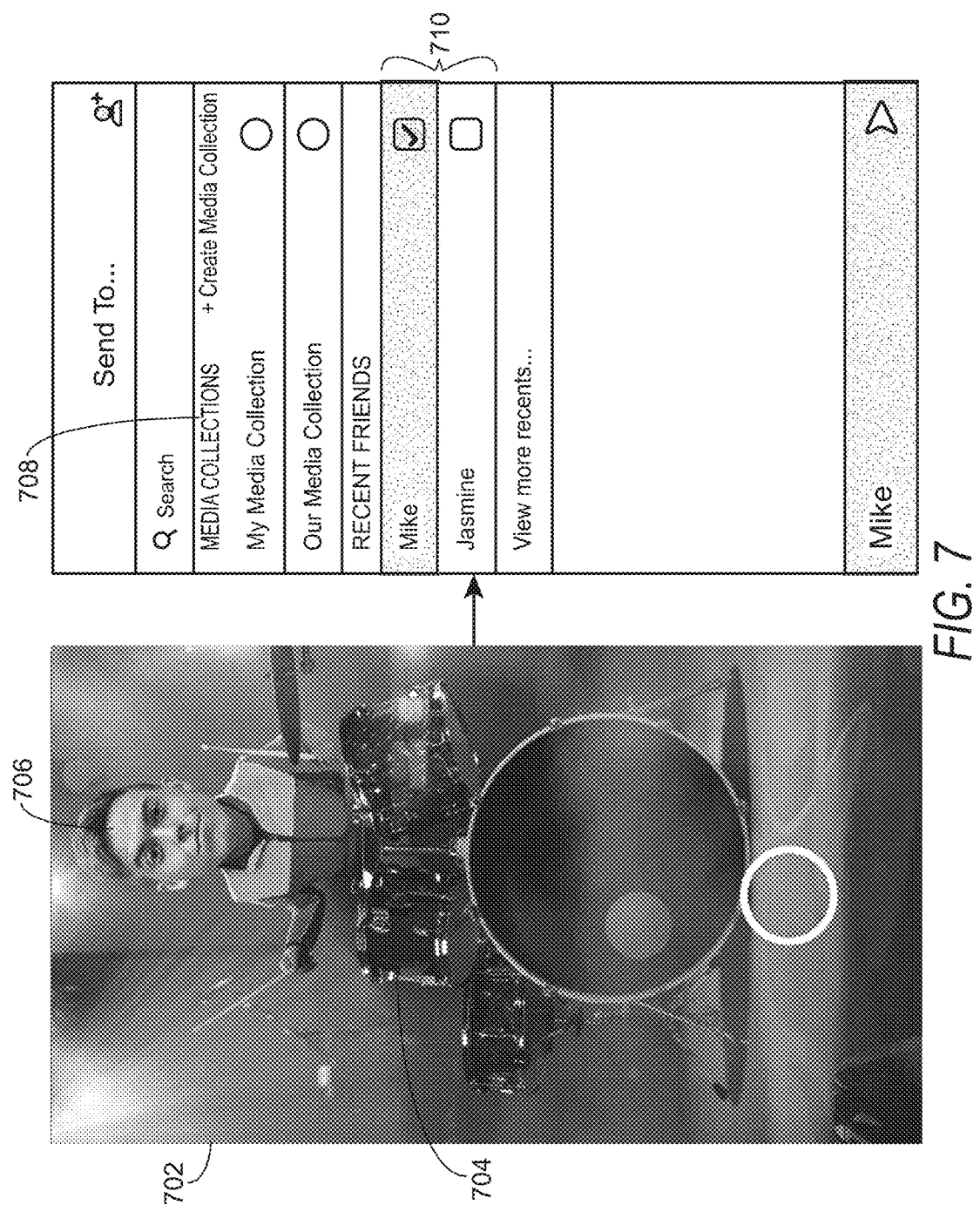
FIGS. 7-9 illustrate example graphical user interfaces, according to some example embodiments.

FIG. 7 shows an example of an interactive message 702 where a user may add an image or video of himself to a band. A first interactive object 704 in the interactive message 702 may be a drummer. The user may capture an image or video of his face to add to the drummer. For example, the user may select an option on the display or elsewhere on the computing device to start capturing video of himself. The computing device may capture a video of the user and associate the video of the user with the first interactive object 704 of the drummer. In one example, the computing device may identify a portion of the video or image that may be captured and capture only the portion of the video or image. In this example, for instance, the computing device may detect the face of the user and only capture the face of the user to display as the face of the drummer 706. This will result in a smaller file size for the media content item. The image or video of the user (e.g., the user's face) is displayed in the first interactive object 704 of the drummer.

The user may indicate that he wishes to share the interactive message 702. For example, the user may choose to save the interactive message 702 as part of a media collection 708 for viewing later by the user or other users that have access to the media collection 708, or may send the interactive message 702 to one or more users 710. The computing device sends the interactive message 702 and the media content item (e.g., the image or video captured by the user) associated with the first interactive object 704 to the server computer.

In one example, the interactive message sent by the computing device may comprise a primary message (e.g., the interactive message and any associated data), metadata (e.g., data, such as a key-value data store, holding arbitrary information such as, unique identifiers corresponding to secondary media assets), secondary media assets (e.g., media content items such as images and videos), and script logic. The primary message on its own may be a regular message that may be shared with other users and included in one or more media collections. The addition of metadata, secondary media assets, and script logic, enable interactivity.

In one example, the metadata is injected into the primary message and is sent from one computing device to another and the secondary media assets are uploaded from the sending computing device to the server computing system independently from the primary message and metadata. In one example, the secondary media assets are also downloaded on the receiving computing device independently from the primary message and metadata. In one example, the secondary media assets are not embedded in the primary message the same way the metadata may be. The script logic combines metadata and the secondary media assets to generate or reproduce the interactive message. The script logic may already be incorporated into the computing device (e.g., part of an application such as a messaging application) or if not, a separate process may initiate retrieving the script logic from a content delivery system (e.g., server system 108).

Thus, using the current example, the computing device may add new entries to the metadata associated with the media content item (e.g., secondary asset) for the interactive message, semi the interactive message 702 (e.g., the primary message), the metadata, and the media content item (e.g., the image or video captured by the user) associated with the first interactive object 704 to the server computer. In another example, the server computer may add the new entries to the metadata to generate serialized data, as described next.

Returning to FIG. 5, after receiving the first media content item associated with the first interactive object, the server computer stores the first media content item and generates serialized data for the interactive message by generating a first session data item comprising a unique identifier for the media content item (e.g., secondary media asset) for the first interactive object of the interactive message and a location for where the first media content item is stored, as shown in operation 504. For example, the first session data item may comprise an identifier (e.g., a unique identifier) for the first media content item and a location for where the first media content item is stored. For example, the first session data item may comprise a key-value pair where the key is the unique identifier for the media content item (e.g., video 1:123456) and the value is the location where the media content item is stored (e.g., a URL). Other data may also be stored (e.g., "score:300", "timeElapsed:60", etc.). The unique identifier for the media content item may be serialized as part of the metadata for the interactive message, as described above. The first session data item may be stored as part of the metadata for the interactive message, as described above. In another example, the metadata may be generated by the computing device, as explained above (e.g., by adding the first session data item to the metadata of the interactive message).

In operation 506, the server computer stores the serialized data comprising the first session data item with the interactive message. For example, the server computer may store the serialized data and interactive message in one or more databases 120. The first media content item may also be stored in one or more databases 120.

In operation 508, the server computer sends the serialized data for the interactive message comprising the first session data item to a second computing device. For example, the server computer may send the interactive message with the serialized data (e.g., metadata attached as a binary blob). The second computing device receives the serialized data, renders the interactive message using the first session data item, and displays the rendered interactive message comprising the first media content item. For example, the second computing device may de-serialize the serialized data (e.g., decode the binary blob or other format) to recreate the interactive message. The second computing device may render the interactive message by retrieving the first media content item using the identifier for the first media content item and the location for where the first media content item is stored. The second computing device displays the interactive message similar to what is displayed in the interactive message 702 in FIG. 7. The second computing device may display the interactive message immediately upon receiving it or may display it upon request from a user to view the interactive message.

Figure 8:
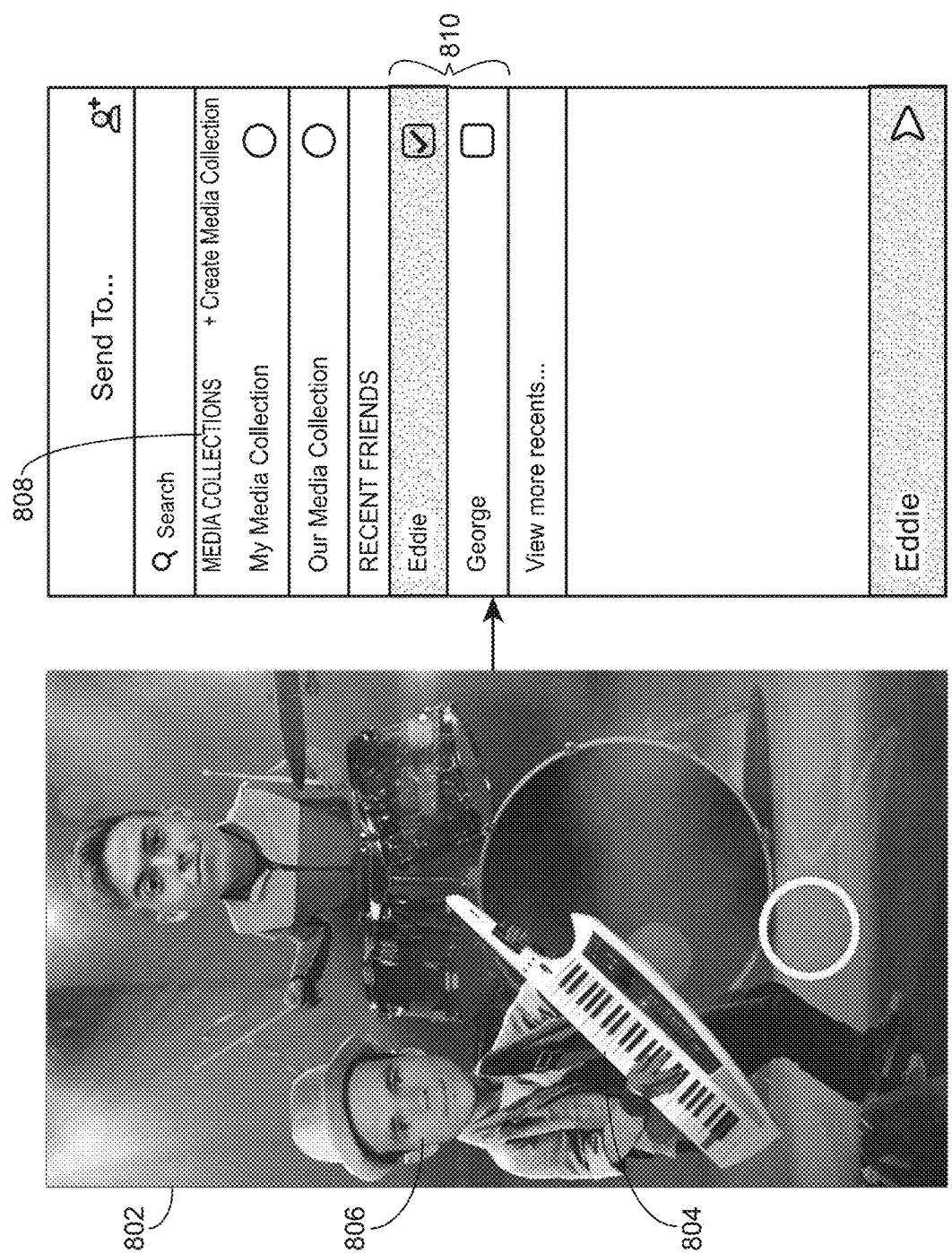

FIG. 8 shows an example of an interactive message 802 where the second user may add an image or video of himself to the band. A second interactive object 804 in the interactive message 802 may be a keyboard player. The user may capture an image or video of his face to add to the keyboard player, as explained above for the drummer. The image or video 806 of the user is displayed (e.g., as the face portion of the keyboard player) in the second interactive object 804 of the keyboard player. In one example, the second interactive object 804 (and any other objects other than the objects that have already been included by other users) is not visible until the second user is viewing the interactive message 802. In one example, the second interactive object 804 may appear when the user is viewing the interactive message 802, indicating that the user may add content to the interactive message 802.

The user may indicate that he wishes to share the interactive message 802. For example, the user may choose to save the interactive message 802 as part of a media collection 808 for viewing later by the user or other users that have access to the media collection 808, or may send the interactive message 802 to one or more users 810. The computing device sends the interactive message 802 and the media content item (e.g., the image or video 806 captured by the user) associated with the second interactive object 804 to the server computer.

Returning to FIG. 5, in operation 510, the server computer receives a second media content item associated with a second interactive object of the interactive message (e.g., a video of a second user's face associated with a keyboard player of a band). For example, the server computer may receive the second media content item from the second computing device.

In operation 512, the server computer stores the second media content item and generates serialized data for the interactive message by generating a second session data item comprising an identifier (e.g., a unique identifier) for the second media content item and a location for where the second media content item is stored and adds the second session data item to the serialized data. As described above for the first session data item, the second session data item may comprise an identifier (e.g., a unique identifier) for the second media content item and a location for where the second media content, item is stored. As also described above, in another example, the metadata may be generated by the computing device, as explained above (e.g., by adding the first session data item to the metadata of the interactive message).

In operation 514, the server computer stores the serialized data comprising the first session data item and the second session data item with the interactive message. For example, the server computer may store the serialized data in one or more databases 120. The second media content item may also be stored in one or more databases 120.

In operation 516, the server computer sends the serialized data for the interactive message comprising the first session data item and the second session data item to a third computing device. For example, the server computer may send the interactive message with the serialized data (e.g., metadata attached as a binary blob). The third computing device receives the serialized data and renders the interactive message using the first session data item and the second session data item and displays the rendered interactive message comprising the first media content, item and the second media content item. For example, the third computing device may de-serialize the serialized data (e.g., decode the binary blob or other format) to recreate the interactive message. The third computing device may render the interactive message by retrieving the first media content item using the identifier for the first media content item and the location for where the first media content item is stored, and retrieve the second media content item using the identifier for the first media content item and the location for where the second media content item is stored. The second computing device displays the interactive message similar to what is displayed in the interactive message 802 in FIG. 8. The third computing device may display the interactive message immediately upon receiving it or may display it upon request from a user to view the interactive message.

Figure 9:
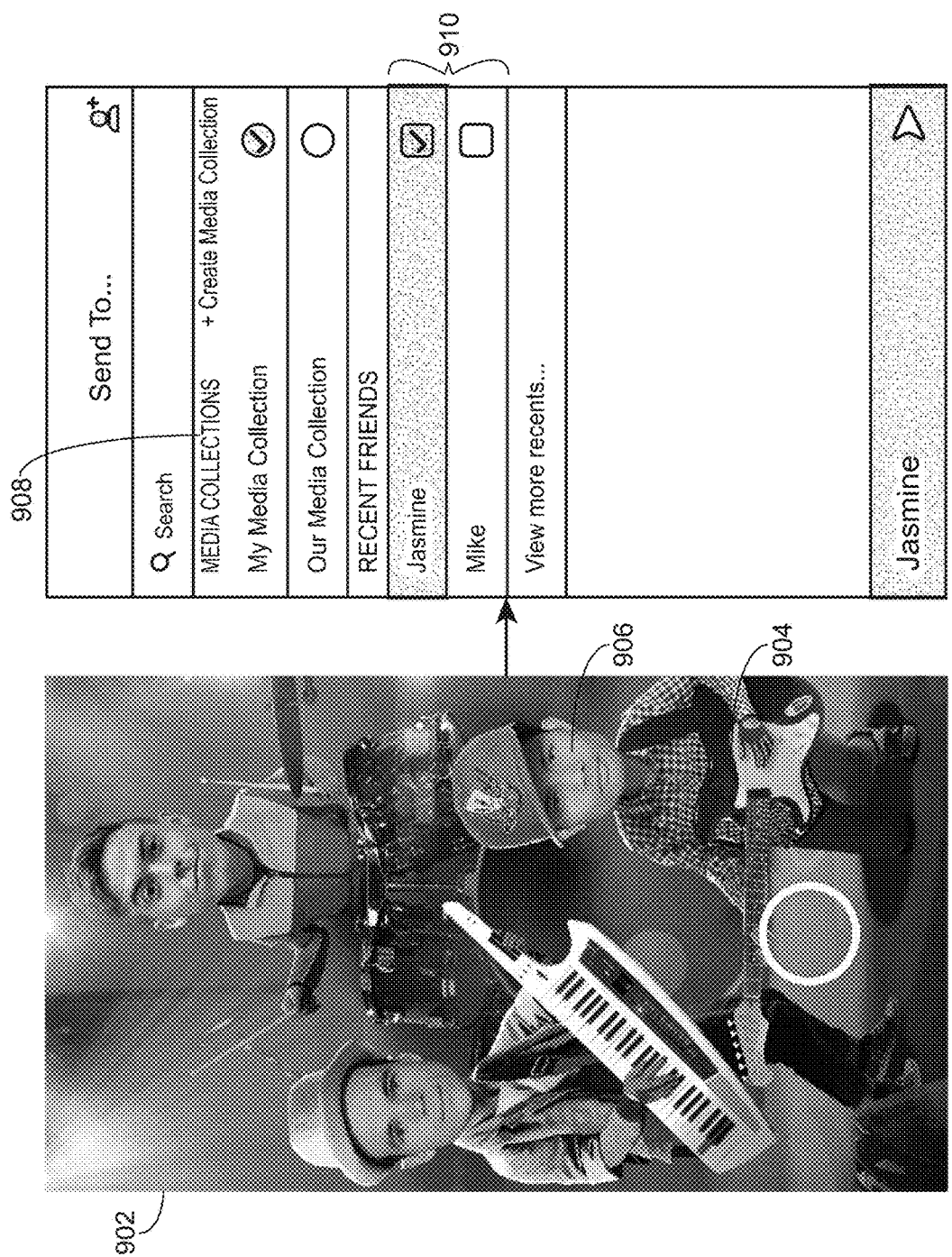

FIG. 9 shows an example of an interactive message 902 where the third user may add an image or video of himself to the band. A third interactive object 904 in the interactive message 902 may be a guitar player. The user may capture an image or video of his face to add to the guitar player, as explained above for the drummer. The image or video 906 of the user is displayed in the third interactive object 904 of the guitar player.

The user may indicate that he wishes to share the interactive message 902. For example, the user may choose to save the interactive message 902 as part of a media collection 908 for viewing later by the user or other users that have access to the media collection 908, or may send the interactive message 902 to one or more users 910. The computing device sends the interactive message 902 and the media content item (e.g., the image or video 906 captured by the user) associated with the third interactive object 904 to the server computer.

The server computer receives the third media content item and continues the process, as described above. For purposes of example, the process above is described using three computing devices associated with three users. In other examples, there could be more or fewer computing devices and users. Furthermore, each interactive message may be sent to just one computing device or may be sent to multiple computing devices. Also, each interactive message may be sent back to a computing device that previously sent the interactive message.

In another example embodiment, an interactive message may comprise a game that may be played and shared between users. For example, the interactive message may be a challenge experience where a first user plays a game and then challenges a second user (or more than one user) to beat their high score. This asynchronous game may be played by users by sending a user-generated interactive message back and forth to each other (or amongst multiple users). For example, a user may select a game in a messaging application running on a first computing device. The game may capture his image (e.g., a video or photograph of the users face) and, once the game is resolved by the first user, the first computing device generates a message comprising the first user's image and the results of the game (e.g., a score or win/loss state). The first user can then customize the generated message (e.g., add text or audio, add an image or video, add a media overly, etc.) and send it to a second user (or multiple users) as a "challenge" to beat his score. The first computing device sends the generated message to a second computing device (e.g., via a server system 108 as described above). When the second user receives the generated message, she can interact with the generated message to enter the game and try to beat the score of the first user. In some cases, the face of the original challenger is used in the new game session. These sessions then go back and forth between friends until one decides not to respond.

Figure 10:
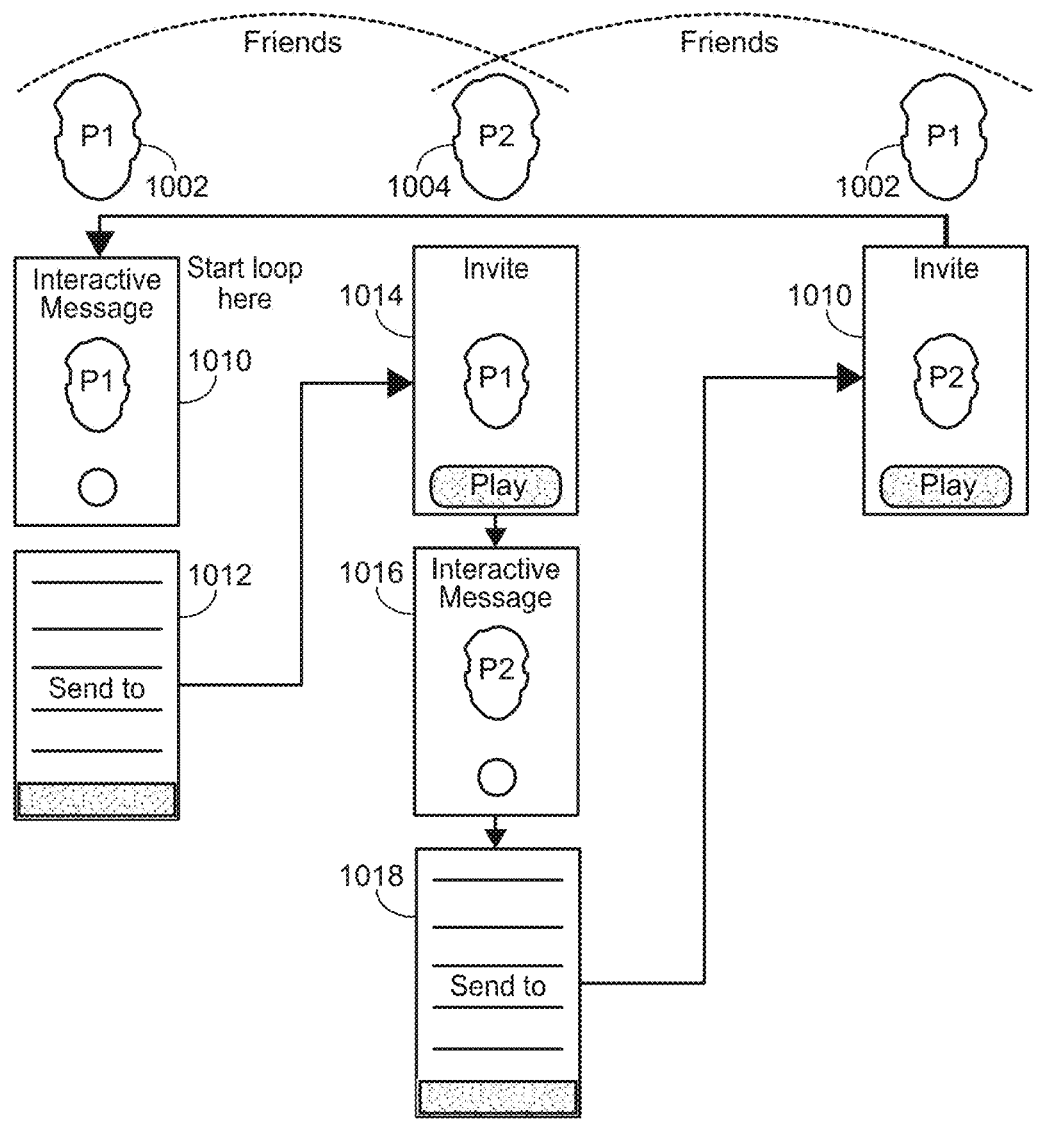
FIG. 10 is a diagram illustrating an example of sharing interactive messages, according to some example embodiments.

FIG. 10 illustrates an example of a game played between two users P1 (1002) and P2 (1004). A first user P1 1002 using a computing device 1010 generates an interactive message by playing a game. The first user P1 1002 may then send 1012 the interactive message to a second user P2 1004. The second user P2 1004 receives the interactive message at a second computing device 1014 and generates an interactive message 1016 by playing the game. The second user P2 1004 may then send 1018 the interactive message 1016 back to the first user P1 1002 (via the second user's device 1014).

Figure 11:
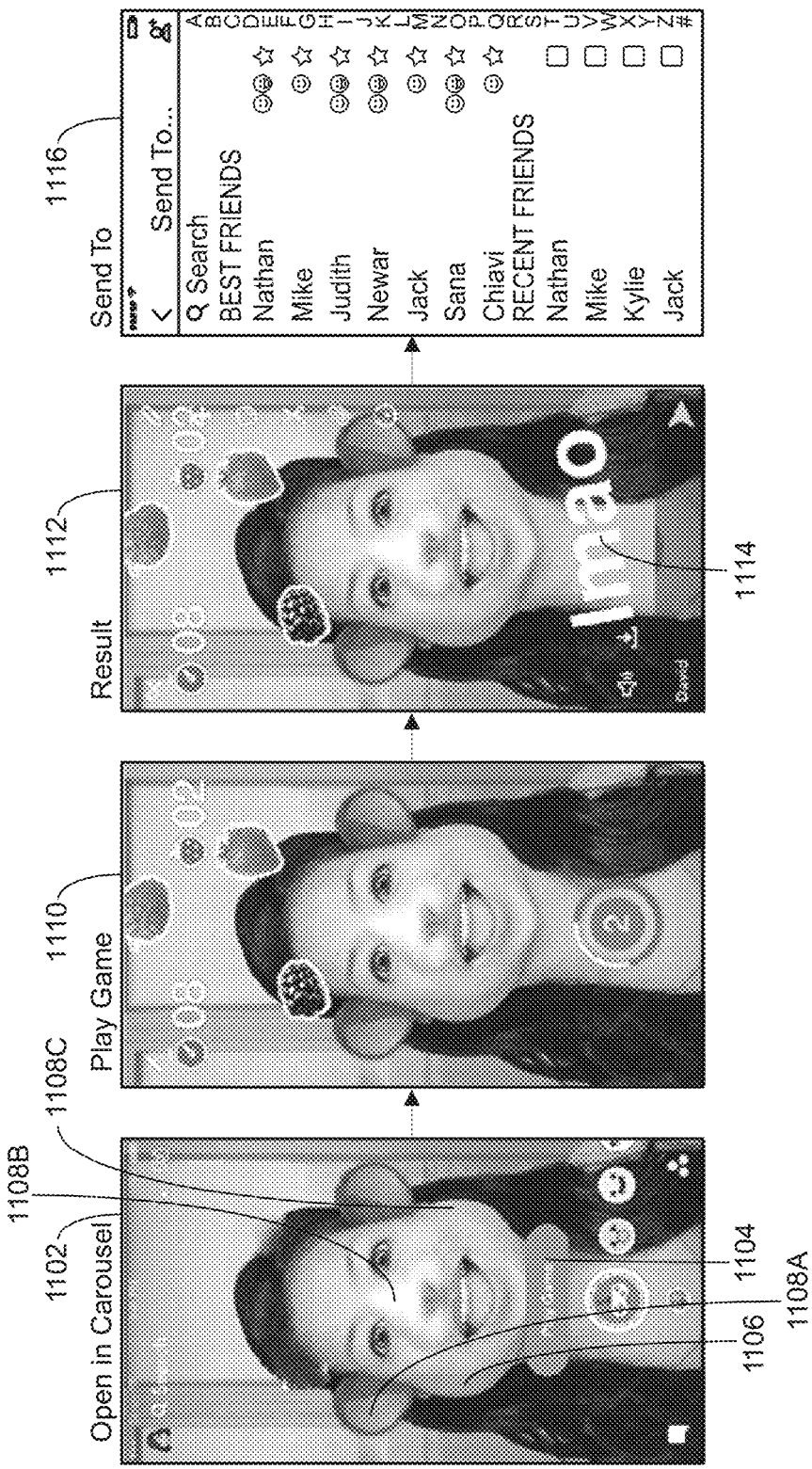
FIGS. 11-12 illustrate example graphical user interfaces, according to some example embodiments.

FIG. 11 illustrates an example of a set of graphical user interfaces (GUIs) on a display of a computing device that show an example game 1102 that may be played between two or more users via interactive messages. A computing device may detect an indication from the first user to play the game 1102. For example, the first user may interact with a touch screen or other control on the computing device, such as pressing the "Play Game" button 1104. The game 1102 may comprise an image 1106 of the first user and may optionally comprise creative tools 1108A-1108C that have been applied by the user to the image 1106 of the user (e.g., media overlays, text, audio, etc.). The GUI 1110 shows an example of the first user playing the game 1102. The GUI 1112 shows an example of results of the game 1102 with some additional text 1114 that the first user has added to the results of the game 1102 to generate an interactive message to send to another users. The first user may apply creative tools, text, audio, or the like to the game results. The GUI 1116 shows an example of a selection of users to which the first user may send the interactive message. The first user may send the interactive message to any number of friends or other users. For example, the first user may send the interactive message with game results to a second user.

Figure 12:
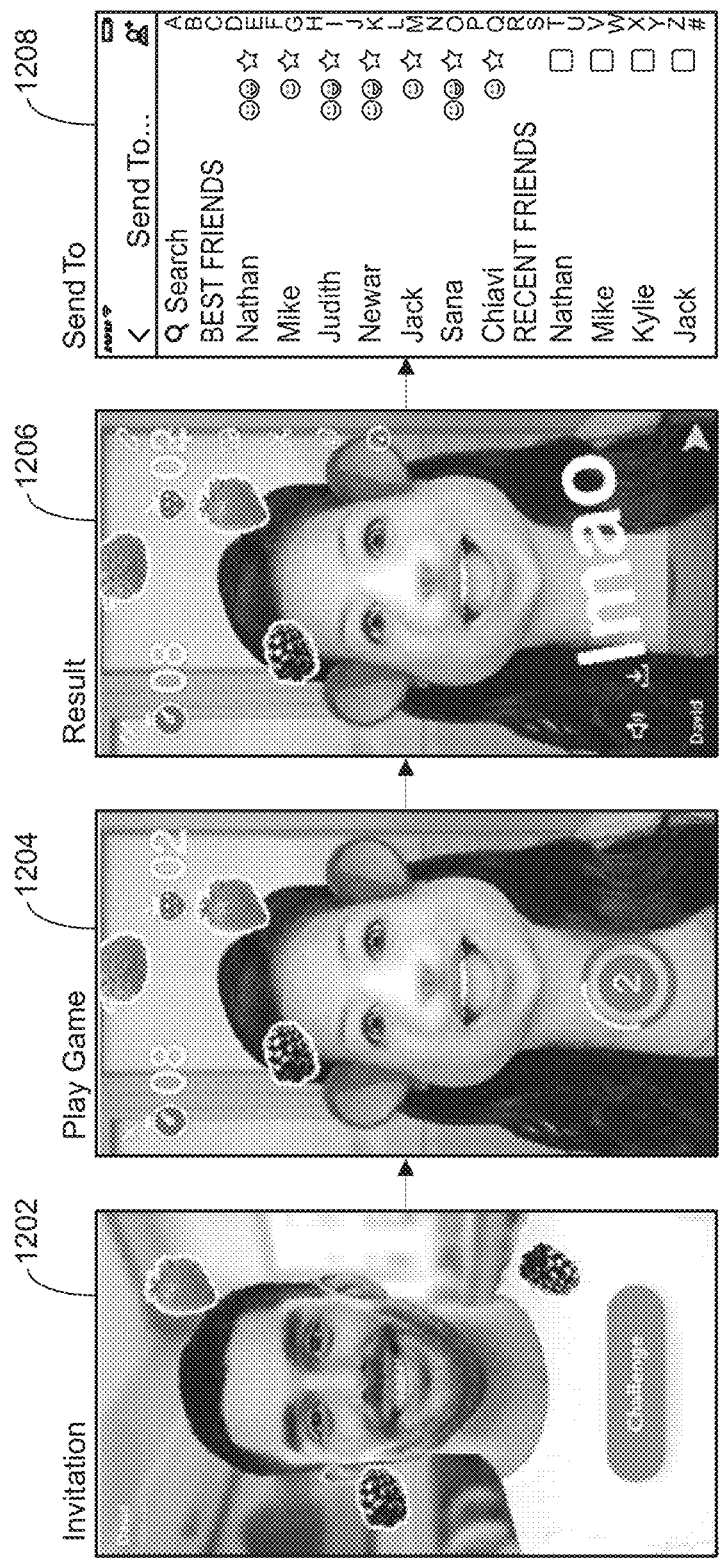

FIG. 12 illustrates an example set of GUIs on a display of a computing device that shows a second user receiving an invitation from the first user in the form of an interactive message 1202. The GUI 1204 shows an example of the second user playing the game (e.g., the game 1102), the GUI 1206 shows an example of results of the game, and the GUI 1208 shows an example of a selection of users to which the second user may send the interactive game, as explained above. The second user may semi the game back to the first user, and/or to any number of other users.

In this example of interactive messages generated by playing a game, the serialized data (e.g., the metadata for the interactive message) may include a score achieved by the ending player, all scores achieved by each player (e.g., each sender), and/or other data to indicate game status that may be used to display a game status or the like to a receiving user (e.g., highest score so far, to indicate to a receiving user that he won or lose, etc.).

The following examples describe various embodiments of methods, machine-readable media, and systems (e.g., machines, devices, or other apparatus) discussed herein.

Example 1

A method comprising:
receiving, by a server computer from a first computing device, a first media content item associated with a first interactive object of an interactive message, the interactive message comprising a plurality of interactive objects;
generating, by the server computer, serialized data for the interactive message by generating a first session data item comprising a unique identifier for the first media content item for the first interactive object of the interactive message and a location for where the first media content item is stored;
storing, by the server computer, the serialized data comprising the unique identifier for the first media content item for the first interactive object of the interactive message and the location for where the first media content item is stored;
sending, by the server computer, the serialized data for the interactive message to a second computing device, wherein the second computing device renders the interactive message using the first session data item and displays the rendered interactive message comprising the first media content item;
receiving, by the server computer from the second computing device, a second media content item associated with a second interactive object of the interactive message;
generating, by the server computer, serialized data for the interactive message by generating a second session data item comprising a unique identifier for the second media content item for the second interactive object of the interactive message and a location for where the second media content item is stored and adding the second session data item to the serialized data;
storing, by the server computer, the serialized data for the interactive message; and
sending, by the server computer, the serialized data for the interactive message comprising the first session data item and the second session data item for the interactive message to a third computing device;
wherein the third computing device renders the interactive message using the first session data item and the second session data item and displays the rendered interactive message comprising the first media content item and the second media content item.

Example 2

A method according to example 1, wherein before receiving the first media content item associated with the first interactive object of the interactive message, the method comprises:
receiving, by the server computer from the first computing device, a request for an interactive message; and
sending, by the server computer, the interactive message to the first computing device.

Example 3

A method according to any of the previous examples, wherein the first media content item is received in a request to send the interactive message to the second computing device.

Example 4

A method according to any of the previous examples, wherein the first media content item is captured using the first computing device and the second media content item is captured using the second computing device.

Example 5

A method according to any of the previous examples, wherein each of the first media content item and the second media content item is a video or an image.

Example 6

A method according to any of the previous examples, wherein the third computing device renders the interactive message by retrieving the first media content item and the second media content item using the identifier for the first media content item and the location for where the first media content item is stored and the identifier for the second media content item and the location for where the second media content item is stored.

Example 7

A method according to any of the previous examples, wherein the second media content item is received in a request to send the interactive message to the third computing device.

Example 8

A computing device comprising:
one or more hardware processors; and
a computer-readable medium coupled with the one or more hardware processors, the computer-readable medium comprising instructions stored thereon that are executable by the one or more hardware processors to cause the computing device to perform operations comprising:
receiving, from a first computing device, a first media content item associated with a first interactive object of an interactive message, the interactive message comprising a plurality of interactive objects;
generating serialized data for the interactive message by generating a first session data item comprising a unique identifier for the first media content item for the first interactive object of the interactive message and a location for where the first media content item is stored;
storing the serialized data comprising the unique identifier for the first media content item for the first interactive object of the interactive message and the location for where the first media content item is stored;
sending the serialized data for the interactive message to a second computing device, wherein the second computing device renders the interactive message using the first session data item and displays the rendered interactive message comprising the first media content item;

receiving, from the second computing device, a second media content item associated with a second interactive object of the interactive message;

generating serialized data for the interactive message by generating a second session data item comprising a unique identifier for the second media content item for the second interactive object of the interactive message and a location for where the second media content item is stored and adding the second session data item to the serialized data;

storing the serialized data for the interactive message; and sending the serialized data for the interactive message comprising the first session data item and the second session data item for the interactive message to a third computing device;

wherein the third computing device renders the interactive message using the first session data item and the second session data item and displays the rendered interactive message comprising the first media content item and the second media content item.

Example 9

A computing device according to any of the previous examples, wherein before receiving the first media content item associated with the first interactive object of the interactive message, the method comprises:

receiving, by a server computer from the first computing device, a request for an interactive message; and sending, by the server computer, the interactive message to the first computing device.

Example 10

A computing device according to any of the previous examples, wherein the first media content item is received in a request to send the interactive message to the second computing device.

Example 11

A computing device according to any of the previous examples, wherein the first media content item is captured using the first computing device and the second media content item is captured using the second computing device.

Example 12

A computing device according to any of the previous examples, wherein each of the first media content item and the second media content item is a video or an image.

Example 13

A computing device according to any of the previous examples, wherein the third computing device renders the interactive message by retrieving the first media content item and the second media content item using the identifier for the first media content item and the location for where the first media content item is stored and the identifier for the second media content item and the location for where the second media content item is stored.

Example 14

A computing device according to any of the previous examples, wherein the second media content item is received in a request to send the interactive message to the third computing device.

Example 15

A non-transitory computer-readable medium comprising instructions stored thereon that are executable by at least one processor to cause a computing device to perform operations comprising:

receiving, from a first computing device, a first media content item associated with a first interactive object of an interactive message, the interactive message comprising a plurality of interactive objects;

generating serialized data for the interactive message by generating a first session data item comprising a unique identifier for the first media content item for the first interactive object of the interactive message and a location for where the first media content item is stored;

storing the serialized data comprising the unique identifier for the first media content item for the first interactive object of the interactive message and the location for where the first media content item is stored;

sending the serialized data for the interactive message to a second computing device, wherein the second computing device renders the interactive message using the first session data item and displays the rendered interactive message comprising the first media content item;

receiving, from the second computing device, a second media content item associated with a second interactive object of the interactive message;

generating serialized data for the interactive message by generating a second session data item comprising a unique identifier for the second media content item for the second interactive object of the interactive message and a location for where the second media content item is stored and adding the second session data item to the serialized data;

storing the serialized data for the interactive message; and sending the serialized data for the interactive message comprising the first session data item and the second session data item for the interactive message to a third computing device;

wherein the third computing device renders the interactive message using the first session data item and the second session data item and displays the rendered interactive message comprising the first media, content item and the second media content item.

Example 16

A non-transitory computer-readable medium according to any of the previous examples, wherein the first media content item is received in a request to send the interactive message to the second computing device.

Example 17

A non-transitory computer-readable medium according to any of the previous examples, wherein the first media content item is captured using the first computing device and the second media content item is captured using the second computing device.

Example 18

A non-transitory computer-readable medium according to any of the previous examples, wherein each of the first media content item and the second media content item is a video or an image.

Example 19

A non-transitory computer-readable medium according to any of the previous examples, wherein the third computing device renders the interactive message by retrieving the first media content item and the second media content item using the identifier for the first media content item and the location for where the first media content item is stored and the identifier for the second media content item and the location for where the second media content item is stored.

Example 20

A non-transitory computer-readable medium according to any of the previous examples, wherein the second media content item is received in a request to send the interactive message to the third computing device.

Figure 13:
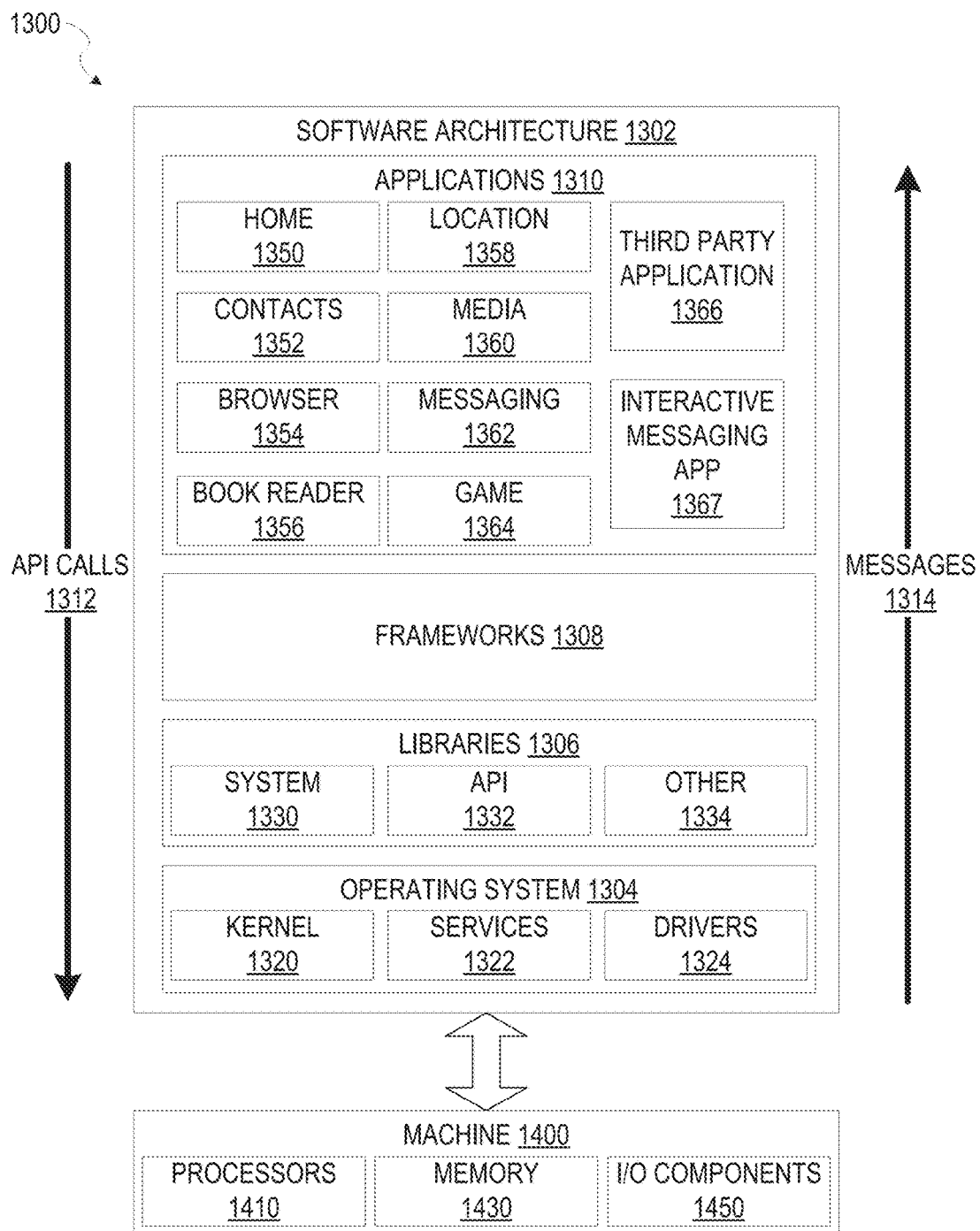
FIG. 13 is a block diagram illustrating an example of a software architecture that may be installed on a machine, according to some example embodiments.

FIG. 13 is a block diagram 1300 illustrating a software architecture 1302, which can be installed on any one or more of the devices described above. For example, in various embodiments, client devices 110, server systems 102, 112, 116, 118, 122, and 124 may be implemented using some or all of the elements of the software architecture 1302. FIG. 13 is merely a non-limiting example of a software architecture, and it will be appreciated that many other architectures can be implemented to facilitate the functionality described herein. In various embodiments, the software architecture 1302 is implemented by hardware such as machine 1400 of FIG. 14 that includes processors 1410, memory 1430, and I/O components 1450. In this example, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (PEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1366 can invoke the API calls 1312 provided by the operating system 1304 to facilitate functionality described herein.

Some embodiments may particularly include an interactive messaging application 1367. In certain embodiments, this may be a standalone application that operates to manage communications with a server system, such as third-party servers or server system 108. In other embodiments, this functionality may be integrated with another application (e.g., messaging application 1362). The interactive messaging application 1367 may request and display various data related to messaging, media content, media collections, media overlays, and so forth, and may provide the capability for a user to input data related to the system via a touch interface, keyboard, or using a camera device of machine 1400, communication with a server system via I/O components 1150, and receipt and storage of object data in memory 1130. Presentation of information and user inputs associated with the information may be managed by the interactive messaging application 1367 using different frameworks 1308, library 1306 elements, or operating system 1304 elements operating on the machine 1400.

Figure 14:
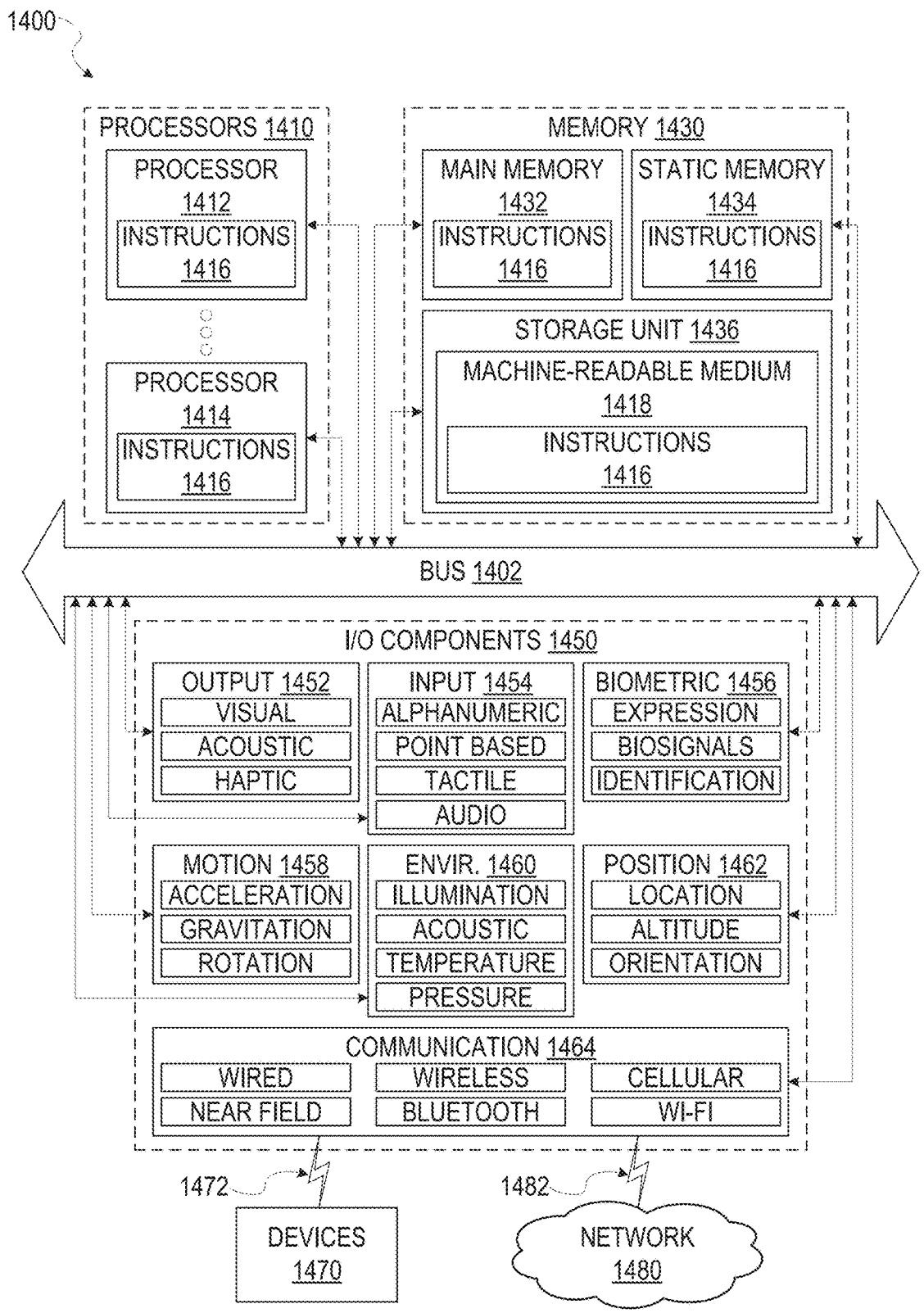
FIG. 14 illustrates a diagrammatic representation of a machine, in the form of a computer system, within which a set of instructions may be executed for causing the machine to perform any one or more of the methodologies discussed herein, according to an example embodiment.

FIG. 14 is a block diagram illustrating components of a machine 1400, according to some embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein can be executed. In alternative embodiments, the machine 1400 operates as a standalone device or can be coupled (e.g., networked) to other machines. In a networked deployment, the machine 1400 may operate in the capacity of a server machine 102, 112, 116, 118, 122, 124, and the like, or a client device 110 in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1412 and a processor 1414 that may execute the instructions 1416. The term "processor" is intended to include multi-core processors 1410 that may comprise two or more independent processors 1412, 1414 (also referred to as "cores") that can execute instructions 1416 contemporaneously. Although FIG. 14 shows multiple processors 1410, the machine 1400 may include a single processor 1410 with a single core, a single processor 1410 with multiple cores (e.g., a multi-core processor 1410), multiple processors 1412, 1414 with a single core, multiple processors 1412, 1414 with multiple cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1418 on which are stored the instructions 1416 embodying any one or more of the methodologies or functions described herein. The instructions 1416 can also reside, completely or at least partially, within the main memory 1432, within the static memory 1434, within at, least, one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1418.

As used herein, the term "memory" refers to a machine-readable medium 1418 able to store data temporarily or permanently and may be taken to include, but not be limited to, random-access memory (RAM), read-only memory (ROM), buffer memory, flash memory, and cache memory. While the machine-readable medium 1418 is shown, in an example embodiment, to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1470 may be another machine 1400 or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1418 is non-transitory (in other words, not having any transitory signals) in that it does not embody a propagating signal. However, labeling the machine-readable medium 1418 "non-transitory" should not be construed to mean that the medium is incapable of movement; the medium 1418 should be considered as being transportable from one physical location to another. Additionally, since the machine-readable medium 1418 is tangible, the machine-readable medium 1418 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by a server computer from a first computing device, a first media content item associated with a first interactive object of an interactive message, the interactive message comprising a plurality of interactive objects;
    generating, by the server computer, serialized data for the interactive message by generating a first session data item comprising a unique identifier for the first media content item for the first interactive object of the interactive message and a location for where the first media content item is stored;
    storing, by the server computer, the serialized data comprising the unique identifier for the first media content item for the first interactive object of the interactive message and the location for where the first media content item is stored;
    sending, by the server computer, the serialized data for the interactive message to a second computing device, wherein the second computing device renders the interactive message using the first session data item and displays the rendered interactive message comprising the first media content item;
    receiving, by the server computer from the second computing device, a second media content item associated with a second interactive object of the interactive message;
    generating, by the server computer, serialized data for the interactive message by generating a second session data item comprising a unique identifier for the second media content item for the second interactive object of the interactive message and a location for where the second media content item is stored and adding the second session data item to the serialized data;
    storing, by the server computer, the serialized data for the interactive message; and
    sending, by the server computer, the serialized data for the interactive message comprising the first session data item and the second session data item for the interactive message to a third computing device;
    wherein the third computing device renders the interactive message using the first session data item and the second session data item and displays the rendered interactive message comprising the first media content item and the second media content item.

2. The method of claim 1, wherein before receiving the first media content item associated with the first interactive object of the interactive message, the method comprises:
    receiving, by the server computer from the first computing device, a request for an interactive message; and
    sending, by the server computer, the interactive message to the first computing device.

3. The method of claim 1, wherein the first media content item is received in a request to send the interactive message to the second computing device.

4. The method of claim 1, wherein the first media content item is captured using the first computing device and the second media content item is captured using the second computing device.

5. The method of claim 1, wherein each of the first media content item and the second media content item is a video or an image.

6. The method of claim 1, wherein the third computing device renders the interactive message by retrieving the first media content item and the second media content item using the identifier for the first media content item and the location for where the first media content item is stored and the identifier for the second media content item and the location for where the second media content item is stored.

7. The method of claim 1, wherein the second media content item is received in a request to send the interactive message to the third computing device.

8. A computing device comprising:
    one or more hardware processors; and
    a computer-readable medium coupled with the one or more hardware processors, the computer-readable medium comprising instructions stored thereon that are executable by the one or more hardware processors to cause the computing device to perform operations comprising:
    receiving, from a first computing device, a first media content item associated with a first interactive object of an interactive message, the interactive message comprising a plurality of interactive objects;
    generating serialized data for the interactive message by generating a first session data item comprising a unique identifier for the first media content item for the first interactive object of the interactive message and a location for where the first media content item is stored;

storing the serialized data comprising the unique identifier for the first media content item for the first interactive object of the interactive message and the location for where the first media content item is stored;

sending the serialized data for the interactive message to a second computing device, wherein the second computing device renders the interactive message using the first session data item and displays the rendered interactive message comprising the first media content item;

receiving, from the second computing device, a second media content item associated with a second interactive object of the interactive message;

generating serialized data for the interactive message by generating a second session data item comprising a unique identifier for the second media content item for the second interactive object of the interactive message and a location for where the second media content item is stored and adding the second session data item to the serialized data;

storing the serialized data for the interactive message; and sending the serialized data for the interactive message comprising the first session data item and the second session data item for the interactive message to a third computing device;

wherein the third computing device renders the interactive message using the first session data item and the second session data item and displays the rendered interactive message comprising the first media content item and the second media content item.

9. The computing device of claim 8, wherein before receiving the first media content item associated with the first interactive object of the interactive message, the method comprises:

receiving, by a server computer from the first computing device, a request for an interactive message; and sending, by the server computer, the interactive message to the first computing device.

10. The computing device of claim 8, wherein the first media content item is received in a request to send the interactive message to the second computing device.

11. The computing device of claim 8, wherein the first media content item is captured using the first computing device and the second media content item is captured using the second computing device.

12. The computing device of claim 8 wherein each of the first media content item and the second media content item is a video or an image.

13. The computing device of claim 8, wherein the third computing device renders the interactive message by retrieving the first media content item and the second media content item using the identifier for the first media content item and the location for where the first media content item is stored and the identifier for the second media content item and the location for where the second media content item is stored.

14. The computing device of claim 8, wherein the second media content item is received in a request to send the interactive message to the third computing device.

15. A non-transitory computer-readable medium comprising instructions stored thereon that are executable by at least one processor to cause a computing device to perform operations comprising:

receiving, from a first computing device, a first media content item associated with a first interactive object of an interactive message, the interactive message comprising a plurality of interactive objects;

generating serialized data for the interactive message by generating a first session data item comprising a unique identifier for the first media content item for the first interactive object of the interactive message and a location for where the first media content item is stored;

storing the serialized data comprising the unique identifier for the first media content item for the first interactive object of the interactive message and the location for where the first media content item is stored;

sending the serialized data for the interactive message to a second computing device, wherein the second computing device renders the interactive message using the first session data item and displays the rendered interactive message comprising the first media content item;

receiving, from the second computing device, a second media content item associated with a second interactive object of the interactive message;

generating serialized data for the interactive message by generating a second session data item comprising a unique identifier for the second media content item for the second interactive object of the interactive message and a location for where the second media content item is stored and adding the second session data item to the serialized data;

storing the serialized data for the interactive message; and sending the serialized data for the interactive message comprising the first session data item and the second session data item for the interactive message to a third computing device;

wherein the third computing device renders the interactive message using the first session data item and the second session data item and displays the rendered interactive message comprising the first media content item and the second media content item.

16. The non-transitory computer-readable medium of claim 15, wherein the first media content item is received in a request to send the interactive message to the second computing device.

17. The non-transitory computer-readable medium of claim 15, wherein the first media content item is captured using the first computing device and the second media content item is captured using the second computing device.

18. The non-transitory computer-readable medium of claim 15, wherein each of the first media content item and the second media content item is a video or an image.

19. The non-transitory computer-readable medium of claim 15, wherein the third computing device renders the interactive message by retrieving the first media content item and the second media content item using the identifier for the first media content item and the location for where the first media content item is stored and the identifier for the second media content item and the location for where the second media content item is stored.

20. The non-transitory computer-readable medium of claim 15, wherein the second media content item is received in a request to send the interactive message to the third computing device.

\* \* \* \* \*